Oct. 23, 1956         J. W. BALLARD ET AL         2,767,974
                         WEIGHING UNIT
                       Filed Dec. 7, 1953
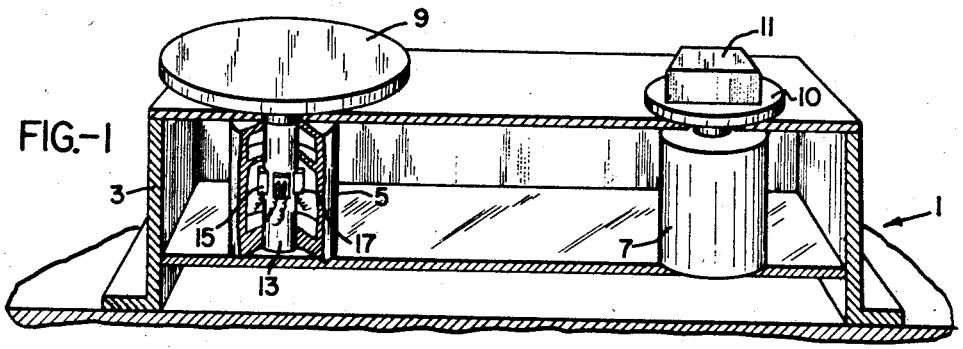
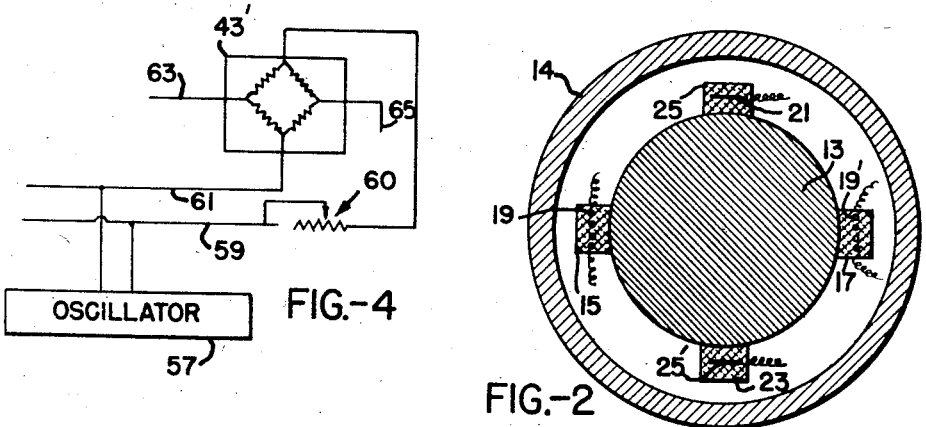
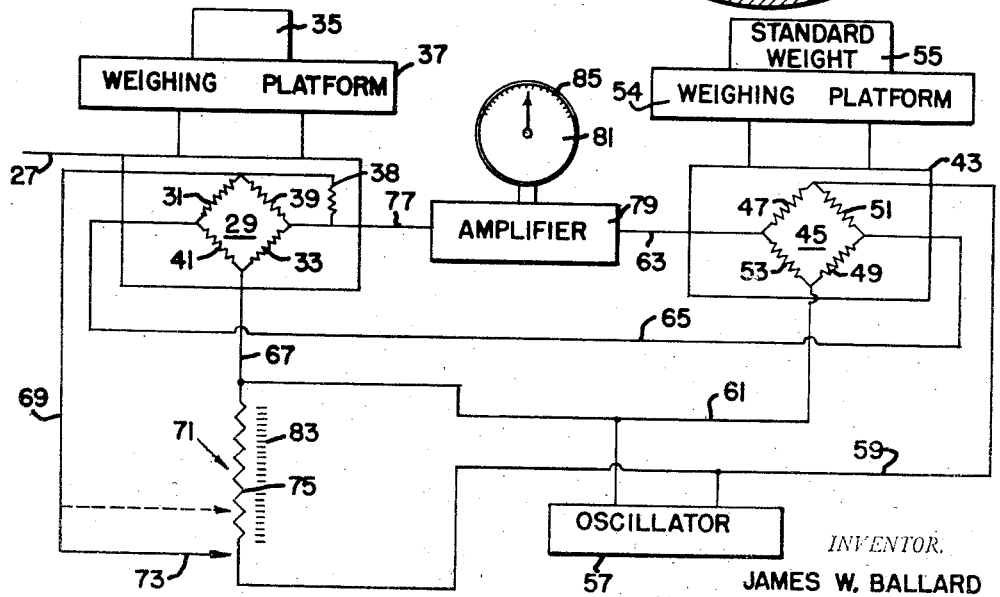
INVENTOR.
JAMES W. BALLARD
WILLIAM R. HORST
BY Toulmin & Toulmin
ATTORNEYS United States Patent Office 2,767,974
Patented Oct. 23, 1956

2,767,974

WEIGHING UNIT

James W. Ballard and William R. Horst, Dayton, Ohio, assignors to The Commonwealth Engineering Company of Ohio, Dayton, Ohio, a corporation of Ohio Application December 7, 1953, Serial No. 396,588

3 Claims. (Cl. 265—27)

This invention relates to a weighing device and more particularly to a device which is useful under conditions where forces other than that of gravity during the weighing action are exerted upon the body to be weighed.

The invention contemplates the provision of a weighing device which would be extremely useful even under the most adverse conditions for effecting weighing. For example, at sea it is frequently desirable to accurately weigh personnel or material and on the smaller craft particularly the effect of transient forces due to yawing, pitch and roll of the ship are such that it is difficult to secure correct weights as the acceleration occasioned by the transient forces interferes with the acceleration occasioned by the purely gravitational force present.

More specifically when a ship, for example, is urged upwardly by the pressure of the sea a weighing device secured to a deck is also urged upwardly—and an object on the device is likewise given an upward acceleration. Consequently the pressure of the object on the weighing device increases over that occasioned by gravitational force alone and the scale reading of the device is in error by an amount which is dependent on the upward accelerating force. Similarly if the ship falls quickly the apparent weight produced by the object is less than the true weight due to the negative acceleration.

While the structures of invention and the method of practicing the invention are applicable to other apparatus which is subject to forces of both negative and positive acceleration, the invention will be described with reference to a ship wherein it has its greatest utility.

It is therefore a principal object of this invention to describe a weighing device which provides for overcoming the effects of the acceleration and deceleration forces occasioned by ship movement.

The invention further contemplates the provision of a novel weighing method wherein the cancellation of effects due to the presence of uncontrolled forces is achieved.

It is a particular object of this invention to describe a weighing device which is essentially electrical in nature, is compact, of a high degree of accuracy and has relative freedom from operational difficulties.

In the practice of the invention load cells are provided each of which has associated therewith electrical circuit means capable of developing an output reflective of the loading of the cell; the cell loading may be occasioned by gravitational forces alone, or by a combination of gravitational forces and forces due to transient accelerations such as those imparted to the cells by upward, downward and rolling movements of the support of the weighing unit.

The electrical outputs due to the transient accelerations are utilized to cancel each other, the cells and circuit means being so constructed and arranged that the cells are subjected to the same transient accelerations resulting in equal outputs which are cancellable; to effect this each of the circuit means may be identical or compensating elements may be introduced into one to render it identical electrically with the other for the purpose of the invention. Accordingly transient forces acting on the cells do not affect the operation of weighing.

To effect the weighing one cell is provided with a standard weight which under the influence of gravity alone occasions a constant output from the circuit means associated with the cell; the other cell is provided with the unknown weight which likewise induces an output the selection of the standard weight and cell preferably being such that the unknown weight will always induce the greater output voltage.

The circuit means of the two cells includes a source of input voltage for each of the cells and the outputs of the cells are each proportional to the product of the input voltage and the individual cell loading. Consequently by decreasing the input voltage to a cell the output voltage decreases also and adjustable means are provided in the practice of the invention to decrease the input to the cell having the unknown weight to bring the output voltage of this cell to a value equal to that of the output of the other cell, the extent of the adjustability required being a measure of the unknown weight.

The invention will be more fully understood by reference to the following detailed description and accompanying drawings wherein:

Figure 1 is a perspective view partially in section which illustrates the structure of invention mounted on a portion of a deck;

Figure 2 is a sectional view of a load cell and illustrates an arrangement of the strain gauges on the sensing element of the cell;

Figure 3 is a schematic arrangement of a circuit embodying the invention; and

Figure 4 illustrates a further embodiment of the invention.

In the inventive embodiments to be described the operation is such that once a calibration is made or a correction is made for accelerations and angular loading for any given weight on the weighing load cells the correction will be automatically accurate for any other weight desired to be measured.

Referring now to the drawings there is indicated generally at 1 in Figure 1 a portion of a deck of a ship to which there is secured in a suitable manner a casing 3; casing 3 includes the components which incorporate the structure of invention and comprises a pair of identical load cells 5, 7.

Referring to the left hand portion of Figure 1 it will be noted that load cell 5 mounts a platform 9; similarly the load cell 7 at the right hand end mounts a platform 10 and a standard weight indicated at 11. Each of the load cells 5, 7 which are preferably identical and have identical electrical circuit means associated therewith are commercially available items; such may be purchased in capacities up to 50,000 pounds, although for the present discussion a cell having a capacity range of 0 to 500 pounds at 4–8 volts input, A. C. or D. C., is considered as suitable and the platform 9 accordingly would only be large enough to accommodate a human. The platform 10 and mass 11 on the cell 7 which mass may suitably be of lead and of approximately 20 pounds weight are in this embodiment equal to the weight of platform 9.

Referring briefly to the left hand end of Figure 1, to Figure 2 and a description of the interior components of a commercial cell, which description is also applicable to cell 7, there is provided interiorly of the casing 5 which abuts the upper end of the casing 3 a solid steel cylinder 13 which is the sensing element and which is itself surrounded by a heavy protective shell 14. The sensing element is customarily chosen to deflect about .006 inch under full or capacity loading and is responsive to compressive as well as tensive stresses.

Extending vertically along the cylinder 13 and in opposed diametrical relation are a pair of strain gauges 15, 17 (Figure 2) which are bonded to the cylinder and extend and contract therewith. The extension and contraction of the fine wires 19, 19' of the strain gauge cause increase and decrease respectively of the electrical resistance of the wire.

In the latter connection it is important to note that if the resistance of the wire were, for example, to be halved by doubling the load the current flow therethrough would be doubled for a given voltage input; further if the voltage input were doubled at a constant resistance the current flow would be doubled; thus the relationship which exists is that the product of the voltage input and the applied load on the cell determine the output voltage of the cell which voltage is directly proportional to that product.

The sensing element 13 also includes a pair of temperature compensating strain gauges 21, 23 and the fine wires thereof indicated at 25, 25' (Figure 2) are unaffected by axial stresses on the cylinder, but are arranged around the periphery and are utilizezd to occasion cancellation of effects due to thermal changes.

The above described arrangement of the load cell is known and is conventional equipment and the description detailed here is presented for the sake of clarity only.

Referring now to Figure 3 in a schematic arrangement of an embodiment of the invention, a weighing load cell indicated at 27 includes a bridge circuit 29 the resistors 31, 33 of which represent the temperature compensating resistors which are subject to resistance change upon change in temperature. The resistors 39, 41 are the active resistors which are subject to resistance change upon application of stress to the sensing member of the cell. Resistor 38 is a very large resistance member which may suitably be included to provide a very slightly unbalanced bridge but is not a necessary element as will be noted hereinafter.

A second load cell 43 is provided with a bridge 45 having active resistors 47, 49 and temperature compensating resistors 51, 53. This load cell is provided with a platform 54 together with standard weight 55 equivalent in weight to that of platform 37.

A 1000 C. P. S. oscillator 57 supplies a voltage input to the bridge 45 across leads 59, 61 and the output of this bridge is derived across leads 63, 65. Oscillator 57 also supplies a voltage input to bridge 29 across leads 67, 69 the latter of which includes a potentiometer indicated generally at 71. Movable arm 73 of the potentiometer 71 moving over the resistance 75 in an upward direction as shown in Figure 3 is effective to decrease the potential input to bridge 29 and as will be noted hereinafter a weight on platform 37 is indicated by scale 83 associated with this potentiometer.

Lead 65 is common to both bridges 45 and 29 and the output of bridge 29 is developed across this lead and lead 77; an amplifier 79 receives the output of the two bridges and bucks them together amplifying the difference and the potential difference is indicated on meter 81.

To place the unit of Figure 3 in operation the oscillator 57 and amplifier 79 are supplied in a conventional manner and controlled by a conventional switch arrangement (not shown) with power from a source (also not shown); bridges 45 and 29 in the no-load condition, that is, without the weighing platforms 37 and 54 and without the standard weight 55, are in a balanced no-load condition. Placing the platform 54 and standard weight 55 on the cell 43 causes contraction of the sensing element of the cell and accordingly of the wires 47, 49 of the bridge, thereby decreasing the resistances 47, 49, and unbalancing the bridge. With the bridge input voltage supplied by the oscillator 57 an output is developed across the leads 63, 65 and the needle of meter 81 will indicate an unbalance.

Similarly, placing the weighing platform 37 on the cell 27 unbalances that bridge and develops an output across leads 65, 67. In the ideal condition under consideration the electrical circuit means of the cells 27, 43 are identical and accordingly the outputs developed are equal and cancel each other and the meter 81 will have a zero center reading. To effect this noted output of the bridge 29 the oscillator 57 supplies full voltage input to the bridge, the arm 73 of the potentiometer 71 being in a zero position.

Potentiometer 71 has associated with it a scale 83 and with the placing of a known load on platform 37 contraction of the elements 31, 33 of the bridge 29 induces an increase in the voltage output of the bridge, thereby causing a differential voltage to appear at the amplifier 79; the amplified voltage passed to the meter 81 causes the meter to attain a positive reading as indicated at 85 showing an unbalance.

Movement of the potentiometer arm 73 upwardly to a position such as shown by the dotted line decreases the input to bridge 29 thereby decreasing the output of bridge 29 to the amplifier 79 and when the meter 81 has been restored to a zero condition by movement of the potentiometer arm 73 the arm will indicate the value of the weight on the scale 83; in this manner the scale 83 may be calibrated.

It is to be noted that resistor 38 is chosen to be very large relative to the bridge resistors and does not materially affect this calibration or subsequent weighing; however resistor 38 may if desired be excluded from the circuit when the unit is operated as described.

The above description of the operation has been set out for a static condition of the weighing unit and the value of unknown weights would similarly be determined for static conditions—that is the meter 81 indicates the balanced output condition and governs the amount which potentiometer arm 73 should be moved.

Should the ship be subjected to an upward acceleration the whole unit would move upwardly with it and the standard weight 55 and an unknown weight 35 would be subjected to similar accelerations. Accordingly the force exerted on the cell 43 by the standard weight 55 and the force exerted on the cell 27 by the unknown weight 35 would be increased and would be increased in the same proportion. Accordingly bridges 45 and 29 would be affected in a similar manner and the voltage developed due to the upward acceleration alone would be equal for each of the bridges and they would thus be balanced out and would have no effect on the amplifier 79.

The foregoing description is particularly applicable to ordinary loadings—where it is desired to measure weights which are a very small percentage of the capacity of the cell it is preferable to simulate loading of the cell by introduction of a resistor as 38. Such a resistor as noted is large relatively but is effective to introduce unbalance into bridge 29. Then with no physical loading of cell 27, that is without even a platform if desired the bridge 29 may be unbalanced sufficiently to develop an output voltage capable of bucking out an output voltage produced by bridge 45 in response to the application of weight thereto. The balancing may be effected by zeroing the meter 81 at center utilizing potentiometer arm 73 to decrease the input potential to bridge 29—the position then of arm 73 is the zero for scale 83 in this calibration.

It is not essential that the cells or circuitory be identical for completely adequate operation; for example, a cell 43' (Figure 4) may be employed which deflects more under a given load than do cells 43 and 27 of Figure 3, since the cells described have a linear response characteristic regardless of capacity. It is only necessary to include in line 59 which is connected to oscillator 57 a potentiometer 60 and to drop the voltage fed to the bridge 45' to decrease the output voltage of this bridge and bring the voltage into conformity with that of bridge 29 in the condition when the platform and standard weights only occasion the outputs. Such arrangement is then correct for all loads applied to the cells since the cells each have a linear response and a doubling of, for example, the load on each doubles the output of each.

Similarly a potentiometer may be employed to reduce the input to the bridge 29 of Figure 3 or potentiometers may be employed on each side of the oscillator to produce the required balance.

It will be understood that this invention is susceptible to modification in order to adopt it to different usages and conditions and accordingly, it is desired to comprehend such modifications within this invention as may fall within the scope of the appended claims.

We claim:

1. A weighing device comprising a pair of load cells positioned in side by side relation and each of which includes a bridge circuit having means to provide an input voltage thereto and has electrical characteristics which are variable in accordance with the loading of the individual cell to develop an output voltage reflective of the said cell loading, one said cell being adapted to receive a weight to be measured, means including a source of voltage connected to the input means of each cell to energize the bridge circuit of the cells to which it is connected to produce equal voltage outputs in the condition in which no weight to be measured is on the one said cell, indicating means actuable in accordance with a developed unbalanced output voltage associated with the one said cell to indicate weight applied to the one said cell, circuit means connecting the cells electrically in opposition to balance out output voltages of the cells, said indicating means being in said circuit means, and adjustable means to limit the voltage input to the said one of the cells in accordance with weight applied to the one said cell whereby variations in weight on the said one cell may be measured by measurement of the adjustment of said adjustable means necessary to produce a balance of said indicating means.

2. In a weighing device, a pair of load cells in side by side relation positioned to be similarly accelerated by transient forces acting on the weighing device, each cell having a bridge circuit, a single oscillator connected to provide a voltage input to each of the bridges of the cells, circuit means including an amplifier connecting the outputs of the bridge circuits in bucking relation to effect cancellation of equal voltage outputs of the bridge circuits; means to load each of the cells to develop an output from each, means on a first one of the cells adapted to receive a weight to be measured potentiometer means including an arm connected to limit the voltage input to said first one of the cells to thereby control the voltage output, meter means connected to the outputs of the bridge to indicate balanced and unbalanced conditions of the cells; scale means traversed by the potentiometer arm to indicate weight measurement on the first cell in a balanced condition of the meter means, and potentiometer means in the input of the second cell between the oscillator and bridge to limit voltage input to the bridge.

3. In a weighing device, a pair of load cells positioned in side by side relation to be similarly accelerated by transient forces acting on the weighing device, each cell having a bridge circuit, a source of voltage connected to provide a first output circuit and a second output circuit to each of the bridges respectively of the cells, circuit means connecting the output of the bridge circuits in bucking relation to effect cancellation of equal voltage outputs of the bridge circuits, means to load each of the cells to develop an output from each and including means on a first one of the cells adapted to receive a weight to be measured, meter means in the circuit means connected to the output of the bridges to indicate balanced and unbalanced conditions of the cells, and means in said first output circuit for limiting the input voltage to said first cell to balance the outputs of said cells.

References Cited in the file of this patent

UNITED STATES PATENTS

| | | |
|---|---|---|
| 2,183,078 | Kemler | Dec. 12, 1939 |
| 2,298,216 | Lamberger | Oct. 6, 1942 |
| 2,610,052 | Macgeorge | Sept. 9, 1952 |
| 2,623,636 | Pounds | Dec. 30, 1952 |
| 2,630,007 | Howe | Mar. 3, 1953 |
| 2,680,373 | Bechberger | June 8, 1954 |
| 2,683,030 | Caule | July 6, 1954 |

FOREIGN PATENTS

| | | |
|---|---|---|
| 536,063 | Great Britain | May 1, 1941 |
| 630,980 | Great Britain | Oct. 25, 1949 |
| 921,978 | France | May 23, 1947 |